(12) United States Patent
Kusano et al.

(10) Patent No.: US 8,982,684 B2
(45) Date of Patent: Mar. 17, 2015

(54) RADIO COMMUNICATION DEVICE AND RADIO COMMUNICATION METHOD

(71) Applicant: KYOCERA Corporation, Kyoto-shi, Kyoto (JP)

(72) Inventors: Yoshimasa Kusano, Yokohama (JP); Takanori Tanaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/157,995

(22) Filed: Jan. 17, 2014

(65) Prior Publication Data

US 2014/0133339 A1    May 15, 2014

Related U.S. Application Data

(63) Continuation of application No. 13/898,257, filed on May 20, 2013, now abandoned, which is a continuation of application No. 12/375,519, filed as application No. PCT/JP2007/064742 on Jul. 27, 2007, now abandoned.

(30) Foreign Application Priority Data

Jul. 28, 2006    (JP) .................................. 2006-207240

(51) Int. Cl.
*H04L 5/04*    (2006.01)
*H04B 7/204*   (2006.01)
*H04W 4/00*    (2009.01)
*H04B 7/208*   (2006.01)
(Continued)

(52) U.S. Cl.
CPC ............. *H04W 24/08* (2013.01); *H04L 5/0023* (2013.01); *H04L 5/0051* (2013.01); *H04L 5/006* (2013.01); *H04L 5/0092* (2013.01); *H04W 24/02* (2013.01); *H04L 5/0085* (2013.01)
USPC ........... 370/204; 370/319; 370/334; 370/344; 375/267

(58) Field of Classification Search
USPC ......... 370/203–211, 319, 328–337, 341–348, 370/431, 441–443, 479–480, 508; 375/259–267, 295, 299, 316, 346–349
See application file for complete search history.

(56) References Cited

U.S. PATENT DOCUMENTS 6,298,092 B1   10/2001   Heath et al. ................... 375/267
6,584,144 B2   6/2003    Alamouti et al. ............. 375/147
(Continued)

FOREIGN PATENT DOCUMENTS

EP    1632975 A1    3/2006
JP    10-173625     6/1998
(Continued)

OTHER PUBLICATIONS

Extended European search report dated Feb. 26, 2014 issued in corresponding European application 077914364.
(Continued)

*Primary Examiner* — Tri H Phan
(74) *Attorney, Agent, or Firm* — Studebaker & Brackett PC

(57) ABSTRACT

A radio base station 100 judges a receiving state of a radio signal in conformity with the orthogonal frequency division multiplexing scheme, and changes a symbol string configuration of a symbol string defined by a size in a frequency axis direction and in a time axis direction, on the basis of the judged receiving state.

4 Claims, 7 Drawing Sheets

(51) Int. Cl.
*H04B 7/02* (2006.01)
*H04W 24/08* (2009.01)
*H04L 5/00* (2006.01)
*H04W 24/02* (2009.01)

(56) References Cited

U.S. PATENT DOCUMENTS

| | | | |
|---|---|---|---|
| 6,870,826 B1 | 3/2005 | Ishizu | 370/343 |
| 7,088,683 B2 | 8/2006 | Sawada et al. | 370/252 |
| 7,450,542 B2 | 11/2008 | Alamouti et al. | 370/330 |
| 7,542,514 B2 | 6/2009 | Song et al. | 375/260 |
| 7,567,528 B2 * | 7/2009 | Naghian et al. | 370/328 |
| 7,626,920 B2 | 12/2009 | Grindahl et al. | 370/208 |
| 7,630,356 B2 * | 12/2009 | Zhang et al. | 370/344 |
| 7,817,729 B2 | 10/2010 | Miyoshi et al. | 375/260 |
| 8,259,668 B2 * | 9/2012 | Beems Hart et al. | 370/330 |
| 2003/0185179 A1 | 10/2003 | Inogai et al. | 370/335 |
| 2004/0042386 A1 | 3/2004 | Uesugi | 370/204 |
| 2004/0071105 A1 | 4/2004 | Maeda et al. | 370/320 |
| 2004/0141481 A1 | 7/2004 | Lee et al. | 370/335 |
| 2004/0264588 A1 | 12/2004 | Song et al. | 375/260 |
| 2005/0243939 A1 | 11/2005 | Jung et al. | 375/260 |
| 2006/0035643 A1 | 2/2006 | Vook et al. | 455/450 |
| 2006/0093057 A1 | 5/2006 | Zhang et al. | 375/267 |
| 2006/0182185 A1 | 8/2006 | Hariguchi | 375/241 |
| 2007/0230431 A1 | 10/2007 | Driesen et al. | |
| 2007/0242600 A1 | 10/2007 | Li et al. | 370/210 |
| 2007/0248155 A1 | 10/2007 | Tujkovic et al. | 375/227 |
| 2009/0202008 A1 * | 8/2009 | Suzuki | 375/260 |
| 2011/0310989 A1 | 12/2011 | Kusano et al. | 375/260 |
| 2012/0159279 A1 | 6/2012 | Braithwaite | 714/751 |

FOREIGN PATENT DOCUMENTS

| | | |
|---|---|---|
| JP | 2000-332724 | 11/2000 |
| JP | 2002-009734 | 1/2002 |
| JP | 2002-185375 | 6/2002 |
| JP | 2003-046481 | 2/2003 |
| JP | 2006-180283 | 7/2006 |
| WO | 2005006699 A1 | 1/2005 |
| WO | WO 2005/015797 A1 | 2/2005 |

OTHER PUBLICATIONS

Japanese language office action dated Oct. 4, 2011 and its English language translation for corresponding Japanese Application No. 2006-207240.

Japanese language office action dated Jan. 17, 2012 and its English language translation for corresponding Japanese Application No. 2011-266221.

Japanese language office action dated Dec. 20, 2011 and its English language translation for corresponding Japanese Application No. 2006-207240.

* cited by examiner

RADIO COMMUNICATION DEVICE AND RADIO COMMUNICATION METHOD

CROSS-REFERENCE TO THE RELATED APPLICATIONS

This application is a continuation of U.S. application Ser. No. 13/898,257 filed on May 20, 2013, which is a continuation of U.S. application Ser. No. 12/375,519, filed on Aug. 25, 2009, which is a national stage of international application No. PCT/JP2007/064742 filed on Jul. 27, 2007 the entire contents of which are incorporated herein by reference. Also, this application is claims the benefit of priority under 35 USC 119 to Japanese Patent Application No. 2006-207240 filed Jul. 28, 2006, the entire contents of which are incorporated herein by reference.

TECHNICAL FIELD

The present invention relates to a radio communication device and a radio communication method for transmitting and receiving radio signals including symbol strings having a predetermined size in a frequency axis direction and in a time axis direction, by using the orthogonal frequency division multiplexing scheme.

BACKGROUND ART

Recently, in a radio communication system such as WiMAX (worldwide interoperability for microwave access), for example, the orthogonal frequency division multiplexing (OFDM) scheme has been used in order to utilize radio resources more efficiently. In addition, adaptive array control by an adaptive array antenna has also been introduced in such radio communication system.

In the adaptive array control, an array weight used to form a beam of a radio signal to be transmitted to a communication destination is calculated based on "known information" included in a radio signal received from the communication destination (a mobile station, for example).

In addition, in the OFDM scheme, a symbol string in which multiple symbols are arranged in a time axis direction and a frequency axis direction (subcarrier direction) is used. Generally, the symbol string includes: preamble symbols used in symbol synchronization and calculation of an array weight; and data symbols used in transmission of user data.

For a case where the adaptive array control is introduced in a radio communication system to which the OFDM scheme is applied as described above, there has been known a method in which the preamble symbol part and the data symbol part of known information used to calculate an array weight is changed in order to calculate the array weight more accurately (Patent Document 1, for example).

Patent Document 1: JP-A 2002-185375 (pages 6 to 7, FIG. 2)

DISCLOSURE OF THE INVENTION

Meanwhile, in the radio communication system described above, a so-called orthogonal frequency division multiple access (OFDM) has also been implemented in which a predetermined number of subcarriers are assigned to each user in order to enable multiple users to perform communications simultaneously.

However, if the number of subcarriers assigned to each user is small, namely, if a frequency band assigned to each user is narrow, there is a problem that an antenna combined gain that can be provided by an array weight obtained using an algorithm such as minimum mean squared error (MMSE) is far from a theoretical value.

Specifically, when the frequency band assigned to each user is narrow, the number of preamble symbols arranged in the frequency axis direction is small. Accordingly, the number of preamble symbols necessary for obtaining the antenna combined gain close to the theoretical value cannot be ensured.

Then, it may be considered to arrange more preamble symbols in the time axis direction in order to obtain the antenna combined gain close to the theoretical value. However, if more preamble symbols are arranged in the time axis direction, the proportion of the preamble symbols included in a symbol string becomes higher than that of the data symbols. This raises another problem that transmission efficiency of the data symbols is degraded.

Hence, the present invention has been made in light of such circumstances, and an object of the present invention is to provide a radio communication device and a radio communication method that can perform adaptive array control in which a desired antenna combined gain can be obtained irrespective of a receiving state of a radio signal, while suppressing degradation of transmission efficiency of data symbols.

The present invention has the following characteristics to solve the problems described above. The first characteristic of the present invention is a radio communication device (radio base station 100) that receives a radio signal (uplink radio signal $RS_{UP}$) from a communication destination (radio communication terminal 200), by using the orthogonal frequency division multiplexing scheme, the radio signal including a symbol string (a symbol string S, for example) having a predetermined size (2×2 configuration, for example) in a frequency axis direction (frequency axis direction $D_F$) and in a time axis direction (time axis direction $D_T$), and performs control of a radio signal (downlink radio signal $RS_{DOWN}$) to be transmitted to the communication destination, on the basis of the symbol string included in the received radio signal, the radio communication device comprising: a receiving state judging unit (receiving unit judging unit 107) configured to judge a receiving state (for example, reception SNR) of the radio signal; and a symbol string configuration changing unit (symbol string configuration changing unit 109) configured to change a symbol string configuration (2×4 configuration, for example) of the symbol string defined by the size in the frequency axis direction and in the time axis direction, on the basis of the receiving state judged by the receiving state judging unit.

According to such radio communication device, the symbol string configuration is changed, as appropriate, to the symbol string configuration of the symbol string defined by the size in the frequency axis direction and in the time axis direction, on the basis of a receiving state of the radio signal following the orthogonal frequency division multiplexing (OFDM) scheme.

In other words, according to such radio communication device, when the receiving state of the radio signal is good, a symbol string configuration having a large size in the frequency axis direction can be used. Meanwhile, if the receiving state of the radio signal is poor, a symbol string configuration having large size in the time axis direction can be used.

Consider a case where a basic size of the data symbol part in the time axis direction is fixed, such as in WiMAX. Here, when the receiving state of the radio signal is good, a greater number of preamble symbols can be arranged in the frequency axis direction by increasing the size of the symbol string in the frequency axis direction, the preamble symbols being necessary to obtain an antenna combined gain close to a theoretical value by control of a radio signal transmitted to a communication destination such as adaptive array control. Consequently, the number of preamble symbols arranged in the time axis direction is reduced, thereby improving transmission efficiency of the data symbols.

Moreover, if the receiving state of the radio signal is poor, the preamble symbols necessary to obtain the antenna combined gain close to the theoretical value by the adaptive array control can be arranged by increasing the size in the time axis direction while avoiding effect of frequency selective fading, although the transmission efficiency of the data symbols degrades.

The second characteristic of the present invention is a characteristic according to the first characteristic of the present invention, the second characteristic further comprising a symbol configuration notification unit (symbol string configuration notification unit 111) configured to notify the communication destination of the symbol string configuration changed by the symbol string configuration changing unit.

The third characteristic of the present invention is a characteristic according to the first or second characteristic of the present invention, wherein the symbol string configuration includes a reference symbol string configuration (4×2 configuration) and a narrowband symbol string configuration (2×2 configuration) having a size in the frequency axis direction smaller than the reference symbol string configuration, and the symbol string configuration changing unit changes the symbol string configuration from the reference symbol string configuration to the narrowband symbol string configuration, when the receiving state judging unit judges that the receiving state satisfies a predetermined condition.

The fourth characteristic of the present invention is a characteristic according to the first or second characteristic of the present invention, wherein the wideband symbol string configuration includes a reference symbol string configuration (4×2 configuration) and a wideband symbol string configuration (8×1 configuration) having a size in the frequency axis direction larger than the reference symbol string configuration, and the symbol string configuration changing unit changes the symbol string configuration from the reference symbol string configuration to the wideband symbol string configuration, when the receiving state judging unit judges that the receiving state satisfies a predetermined condition.

The fifth characteristic of the present invention is a characteristic according to any one of the first to third characteristic of the present invention, wherein the symbol string configuration includes a reference symbol string configuration (4×2 configuration), a first narrowband symbol string configuration (2×2 configuration) and a second narrowband symbol string configuration (2×4 configuration), the first narrowband, symbol string configuration having a size in the frequency axis direction smaller than the reference symbol string configuration, the second narrow band symbol string configuration having a in the time axis direction larger than the first narrowband symbol string configuration, and the symbol string configuration changing unit changes the symbol string configuration to the first narrowband symbol string configuration instead of the reference symbol string configuration when the receiving state judging unit judges that the receiving state does not satisfy a predetermined condition, and changes the symbol string configuration from the first narrowband symbol string configuration to the second narrowband symbol string configuration when the receiving state judging unit judges that the receiving state does not satisfy the predetermined condition even in the first narrowband symbol string configuration.

The sixth characteristic of the present invention is a characteristic according to the third characteristic of the present invention, wherein the radio communication device receives a radio signal including the symbol string and performs adaptive array control of the radio signal transmitted to the communication destination on the basis of the symbol string included in the received radio signal, the symbol string includes a preamble symbol (preamble symbol P) used in calculation of an array weight, and the symbol string configuration changing unit changes the reference symbol string configuration and the narrowband symbol string configuration to symbol string configurations having a same number of preamble symbols.

The seventh characteristic of the present invention is a characteristic according to the fourth characteristic of the present invention, wherein the radio communication device receives a radio signal including the symbol string and performs adaptive array control of the radio signal transmitted to the communication destination on the basis of the symbol string included in the received radio signal, the symbol string includes a preamble symbols (preamble symbols P) used in calculation of an array weight, and the symbol string configuration changing unit changes the reference symbol string configuration and the wideband symbol string configuration to symbol string configurations having a same number of preamble symbols.

The eighth characteristic of the present invention is a characteristic according to the first to seventh characteristic of the present invention, wherein the symbol string includes a preamble symbol (preamble symbol P) used in calculation of an array weight, and the symbol string configuration changing unit changes a symbol string configuration of the preamble symbol defined by a size in the frequency axis direction and in the time axis direction.

The ninth characteristic of the present invention is a radio communication method in which a radio signal including a symbol string having a predetermined size in the frequency axis direction and in the time axis direction is received from a communication destination by using the orthogonal frequency division multiplexing scheme, and an adaptive, array control of a radio signal to be transmitted to the communication destination is performed on the basis of the symbol string included in the received radio signal, the radio communication method comprising the steps of: judging a receiving state of the radio signal; and changing a symbol string configuration of the symbol string defined by the size in frequency axis direction and in the time axis direction on the basis of the judged receiving state.

The tenth characteristic of the present invention is a characteristic according to the tenth characteristic of the present invention further comprising the step of notification the communication destination of the symbol string configuration changed in the step of changing the symbol string configuration.

The eleventh characteristic of the present invention is a characteristic according to the ninth or tenth characteristic of the present invention, wherein a reference symbol string configuration and a narrowband symbol string configuration are included in the symbol string configuration, the narrowband symbol string configuration having a size in the frequency axis direction smaller than the reference symbol string configuration, and, in the step of changing the symbol string configuration, the symbol string configuration is changed from the reference symbol string configuration to the narrowband symbol string configuration, when it is judged that the receiving state satisfies a predetermined condition.

The twelfth characteristic of the present invention is a characteristic according to the ninth or tenth characteristic of the present invention, wherein a reference symbol string configuration and a wideband symbol string configuration are included in the symbol string configuration, the wideband symbol configuration having a size in the frequency axis direction larger than the reference symbol string configuration, and, in the step of changing the symbol string configuration, the symbol string configuration is changed from the reference symbol string configuration to the wideband symbol string configuration, when it is judged that the receiving state satisfies a predetermined condition.

The thirteenth characteristic of the present invention a characteristic according to the eleventh characteristic of the present invention, wherein the symbol string includes preamble symbols used in calculation of an array weight, and in the step of changing the symbol string configuration, the reference symbol string configuration and the narrowband symbol string configuration are changed into symbol string configurations including a same number of preamble symbols.

The fourteenth characteristic of the present invention is a characteristic according to the twelfth characteristic of the present invention, wherein the symbol string includes a preamble symbol used in calculation of an array weight, and, in the step of changing the symbol string configuration, the reference symbol string configuration and the wideband symbol string configuration are changed into symbol string configurations including a same number of preamble symbols.

A fifteenth characteristic of the present invention is a characteristic according to any one of the ninth to fourteenth characteristic of the present invention, wherein the symbol string includes a preamble symbol used in calculation of array weight, and, in the step of changing the symbol string configuration, the symbol string configuration of the preamble symbols defined by the size in the frequency axis direction and in the time axis direction is changed.

According to the characteristics of the present invention, a radio communication device and a radio communication method can be provided that can execute adaptive array control in which a desired antenna combined gain can be obtained irrespective of a receiving state of a radio signal, while suppressing degradation of transmission efficiency of data symbols.

BRIEF DESCRIPTION OF THE INVENTION

BEST MODE FOR CARRYING OUT THE INVENTION

Figure 1:
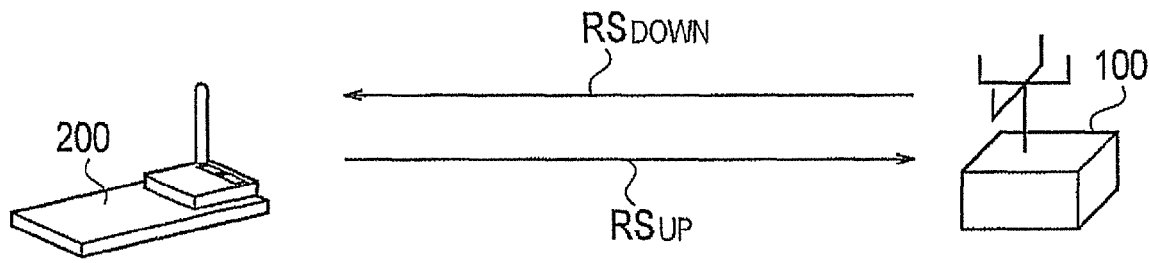
FIG. 1 is an overall schematic configuration diagram of a radio communication system according to an embodiment of the present invention.

Embodiments of the present invention will be described hereinafter. Note that, in the following description of the drawings, same or similar parts are denoted with same or similar reference numerals. It should be noted, however, that the drawings are schematic and proportions or the like of each of the dimensions differ from actual dimensions.

Hence, specific dimensions or the like should be determined by considering the following description. It is also needless to say that respective drawings may include parts that have different dimensional relations or proportions from each other.

(Overall Schematic Configuration of Radio Communication System)

FIG. 1 is an overall schematic configuration diagram of a radio communication system according to the embodiment. As shown in FIG. 1, the radio communication system according to the embodiment consists of a radio base station 100 and a radio communication terminal 200. Note that, the number of the radio base station and the radio communication terminal is not limited to the number shown in FIG. 1.

In the radio base station 100 and the radio communication terminal 200, the Orthogonal Frequency Division Multiplexing (OFDM) scheme is used. Specifically, the radio base station 100 and the radio communication terminal 200 are a radio communication device complying with WiMAX (worldwide interoperability for microwave access). In WiMax, so-called Orthogonal Frequency Division Multiple Access (OFDMA) is used which assigns a predetermined number of subcarriers to each user.

In addition, the radio base station 100 performs adaptive array control of a downlink radio signal $RS_{DOWN}$ to be transmitted to the radio communication terminal 200 (communication destination), on the basis of a symbol string included in an uplink radio signal $RS_{UP}$ received from the radio communication terminal 200.

In the embodiment, the radio communication terminal 200 is a card type radio communication terminal that is to be attached to a notebook-type personal computer, PDA (not shown) or the like.

(Functional Block Configuration)

Next, configurations of the radio base station 100 and the radio communication terminal 200 will be described. Note that, in the following, parts related to the present invention will be mainly described. Therefore, it should be noted that the radio base station 100 and the radio communication terminal 200 may include a logical block (such as a power supply unit) that is essential to implement functions as the device but is not shown or omitted of description.

(1) Radio Base Station 100

Figure 2:
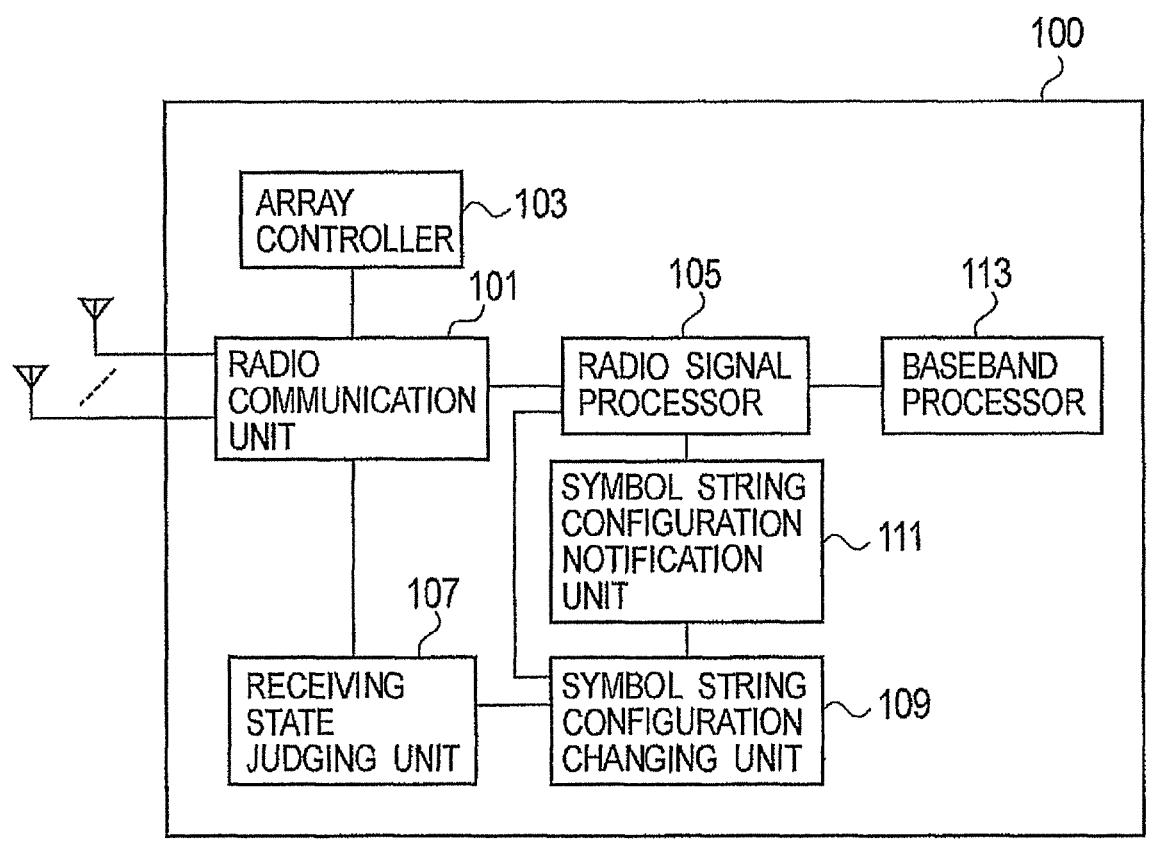
FIG. 2 is a functional block configuration diagram of a radio communication device (radio base station) according to the embodiment of the present invention.

FIG. 2 is a functional block configuration diagram of the radio base station 100. As shown in FIG. 2, the radio base station 100 includes a radio communication unit 101, an array controller 103, a radio signal processor 105, a receiving state judging unit 107, a symbol string configuration changing unit 109, a symbol string configuration notification unit 111, and a baseband processor 113.

The radio communication unit 101 transmits and receives a radio signal in accordance with the OFDM scheme. Here, FIG. 6 shows one example of a symbol string included in an uplink radio signal $RS_{UP}$ that the radio communication unit 101 receives from the radio communication terminal 200.

Figure 6:
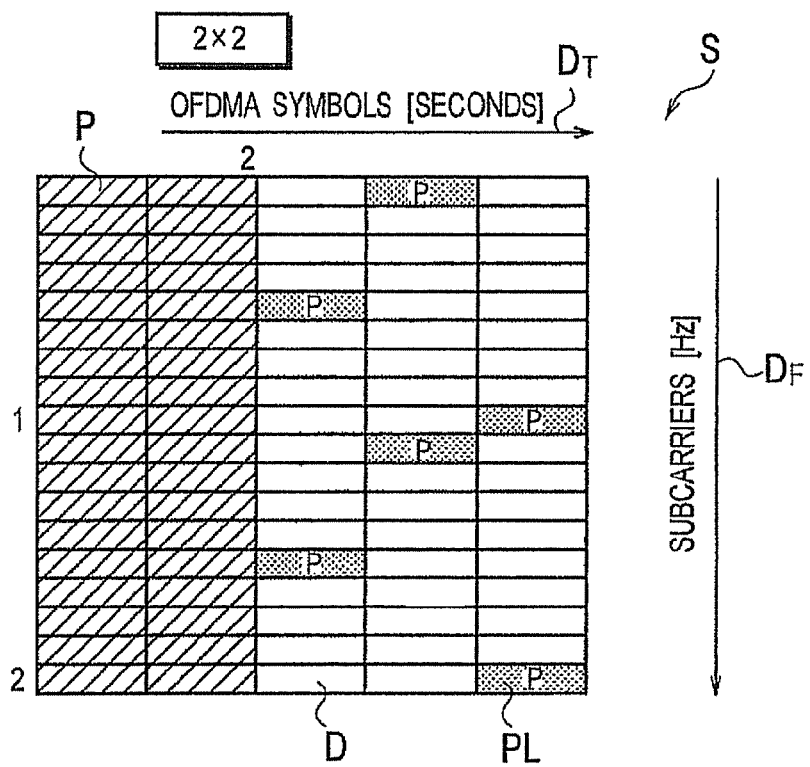
FIG. 6 is a view showing one example of a symbol string according to the embodiment of the present invention.

As shown in FIG. 6, a symbol string S has a predetermined size in the frequency axis direction $D_F$ and in the time axis direction $D_T$. The symbol string S is formed of a preamble symbol P and a data symbol D. Moreover, the data symbol D includes a predetermined number of pilot symbols PL.

The frequency axis direction $D_F$ is defined by the number of subcarriers, i.e., a bandwidth. In the embodiment, 9 carriers (one line represents one carrier in the diagram) are defined as one unit (1 bin). Moreover, the time axis direction $D_T$ is defined by the number of OFDMA symbols.

In the embodiment, the data symbol D is configured of 18 carriers, namely 2 bins, in the frequency axis direction $D_F$, and 3 symbols in the time axis direction $D_T$, as a basic size. More than one data symbols D of the basic size can be arranged along the frequency axis direction $D_F$.

Moreover, in the symbol string S, the preamble symbol P is configured of 18 carriers, namely, 2 bins, in the frequency axis direction $D_F$, and 2 symbols (2×2 configuration) in the time axis direction $D_T$ as a basic size. In the embodiment, a symbol string configuration is identified based on the configuration of the preamble symbol P. Namely, the symbol string S is expressed as a 2×2 configuration. The preamble symbol P is used in calculation of an array weight.

The array controller 103 performs adaptive array control of a downlink radio signal $RS_{DOWN}$ to be transmitted to the radio communication terminal 200, on the basis of a symbol string S included in an uplink radio signal $RS_{UP}$ received from the radio communication terminal 200.

Specifically, the array controller 103 calculates an array weight to be applied to the downlink radio signal $RS_{DOWN}$ on the basis of the preamble symbol P (see FIG. 6). The array controller 103 also controls a beam pattern of the downlink radio signal $RS_{DOWN}$ to be transmitted by the radio communication unit 101 on the basis of the calculated array weight.

The radio signal processor 105 performs processing related to the downlink radio signal $RS_{DOWN}$ transmitted by the radio communication unit 101 and an uplink radio signal $RS_{UP}$ received by the radio communication unit 101. In the embodiment, in particular, the radio signal processor 105 can change a symbol string configuration of a symbol string S included in the downlink radio signal $RS_{DOWN}$.

The receiving state judging unit 107 judges a receiving state of the uplink radio signal $RS_{UP}$ received by the radio communication unit 101. Specifically, the receiving state judging unit 107 estimates a signal-to-noise ratio (reception SNR) of the uplink radio signal $RS_{UP}$. Specifically, the receiving state judging unit 107 calculates correlation of the preamble symbol P and the data symbol D, on the basis of the preamble symbol P included in the uplink radio signal $RS_{UP}$, and estimates the reception SNR of the uplink radio signal $RS_{UP}$ (subcarriers). In addition, in the radio communication system according to the embodiment, transmission power, a phase, time (transmission cycle) and the like of the uplink radio signal $RS_{UP}$ is adjusted so that the reception SNR becomes largest. Namely, a target SNR is set in the radio communication system according to the embodiment, the target SNR having a control evaluation value being a reception SNR that will be necessary depending on a modulation scheme, and control of the uplink radio signal $RS_{UP}$ is performed so as to maintain the target SNR.

The symbol string changing unit 109 changes a symbol string configuration of a symbol string S on the basis of the receiving state judged by the receiving state judging unit 107. In the embodiment, a 4×2 configuration shown in FIG. 7, a 2×4 configuration shown in FIG. 8, and an 8×1 configuration shown in FIG. 9 can be used, in addition to the 2×2 configuration shown in FIG. 6.

Figure 7:
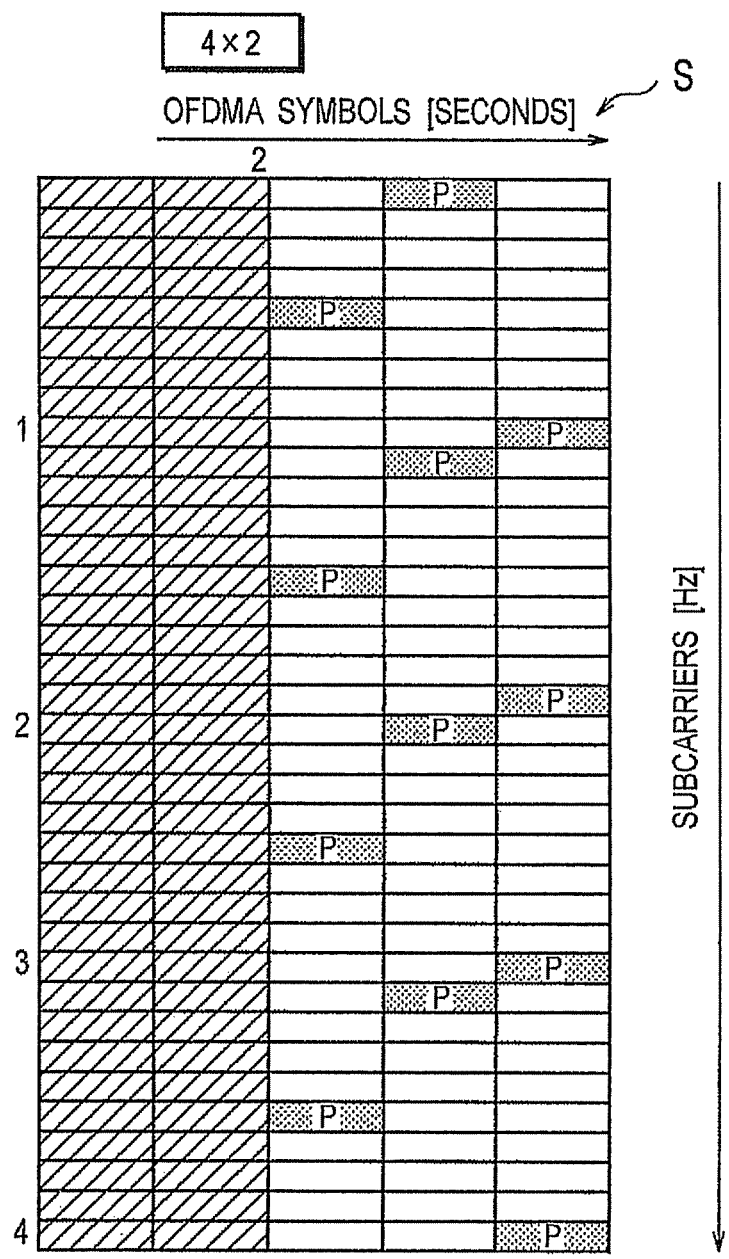
FIG. 7 is a diagram showing an example of a symbol string according to the embodiment of the present invention.
Figure 8:
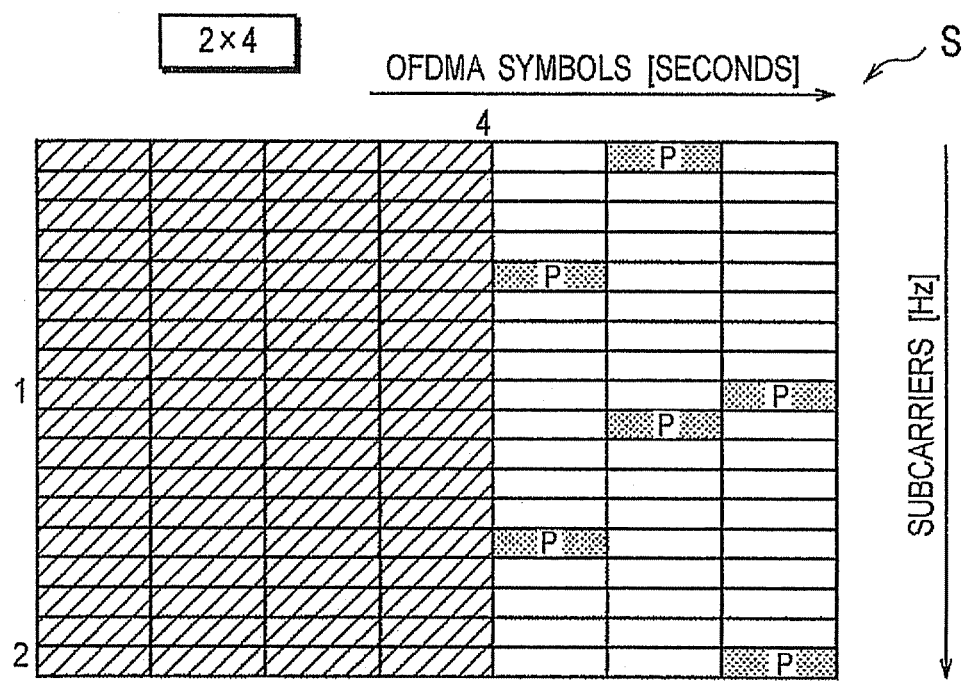
FIG. 8 is a diagram showing an example of a symbol string according to the embodiment of the present invention.
Figure 9:
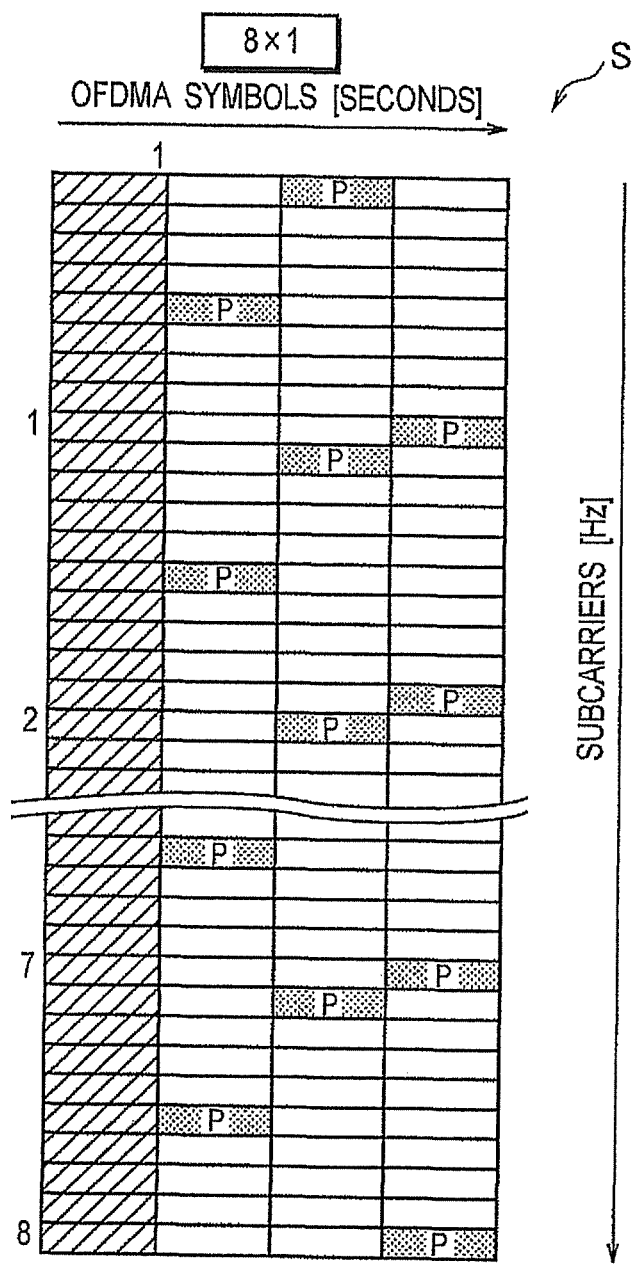
FIG. 9 is a diagram showing an example of a symbol string according to the embodiment of the present invention.

In the embodiment, the 4×2 configuration shown in FIG. 7 is referred to as a reference symbol string configuration. In addition, the 2×2 configuration shown in FIG. 6 and the 2×4 configuration shown in FIG. 8 are referred to as a narrowband symbol string configuration which is smaller in size in the frequency axis direction $D_F$ compared to the reference symbol string configuration. In addition, the 8×1 configuration shown in FIG. 9 is referred to as a wideband symbol string configuration which is larger in size in the frequency axis direction $D_F$ compared to the reference symbol string configuration.

Namely, in the embodiment, the symbol string configuration changing unit 109 changes a symbol string configuration of the entire symbol string S on the basis of a symbol string configuration of the preamble symbol P (4×2 configuration, for example).

When it is judged that the receiving state of the uplink radio signal $RS_{UP}$ satisfies a predetermined condition, specifically, when the reception SNR measured by the receiving state judging unit 107 fell below a predetermined threshold, the symbol string configuration changing unit 109 changes symbol string configuration from the reference symbol string configuration (4×2 configuration) to the narrowband symbol string configuration (2×2 configuration).

Moreover, when the reception SNR measured by the receiving state judging unit 107 fell under the predetermined threshold, the symbol string configuration changing unit 109 may change the symbol string configuration from the 2×2 configuration (first narrowband symbol string configuration) to the 2×4 configuration (second narrowband symbol string configuration). In other words, the symbol string configuration changing unit 109 can change the symbol string configuration to a symbol string configuration including a same number of preamble symbols, in the reference symbol string configuration and the narrowband symbol string configuration.

In addition, when the reception SNR measured by the receiving state judging unit 107 exceeds a predetermined threshold, the symbol string configuration changing unit 109 changes the symbol string configuration from the reference symbol string configuration (4×2 configuration) to the wideband symbol string configuration (8×1 configuration). Namely, the symbol string configuration changing unit 109 can change symbol string configuration to a symbol string configuration including a same number of preamble symbols, in the reference symbol string configuration and the wideband symbol string configuration.

The symbol string configuration notification unit 111 notifies the radio communication terminal 200 of the symbol string configuration changed by the symbol string configuration changing unit 109. Specifically, the symbol string configuration notification unit 111 transmits a symbol string configuration notification indicating the symbol string configuration changed by the symbol string configuration changing unit 109, to the radio communication terminal 200. Note that, the symbol string configuration notification is included in a downlink radio signal $RS_{DOWN}$ and transmitted to the radio communication terminal 200.

The baseband processor 113 is connected to the radio signal processor 105. The baseband processor 113 transmits a baseband signal such as user data, control data and the like to the radio signal processor 105. The baseband processor 113 also demodulates a radio signal received from the radio signal processor 105 into a baseband signal.

(2) Radio Communication Terminal 200

Figure 3:
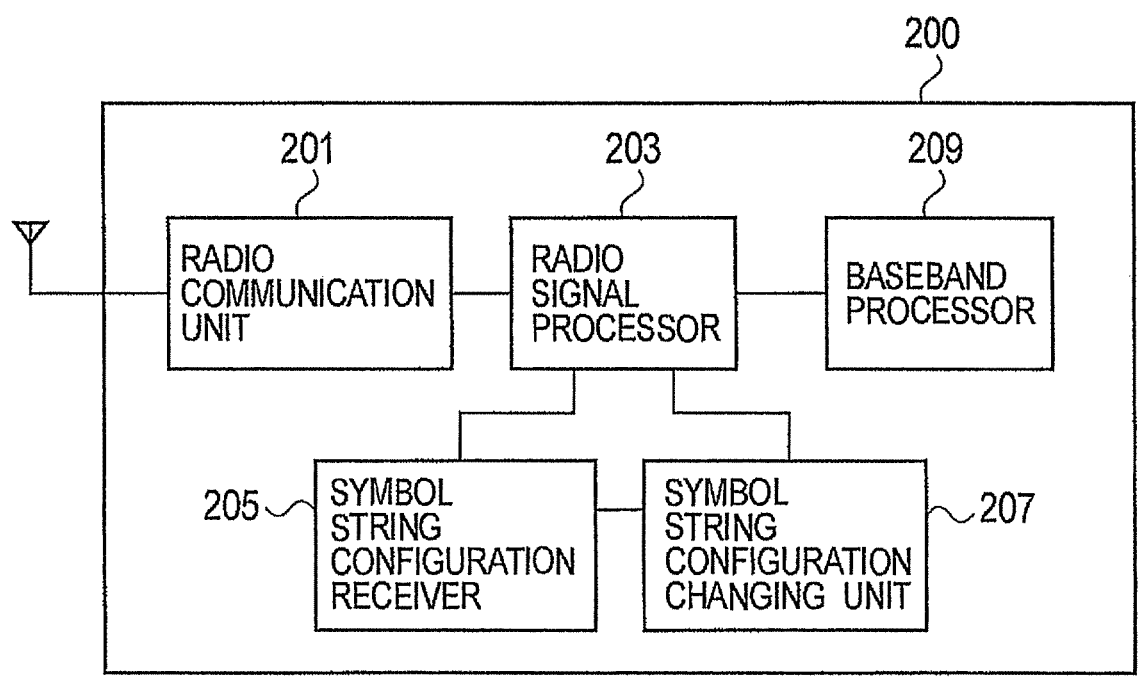
FIG. 3 is a functional block configuration diagram of a radio communication device (radio communication terminal) according to the embodiment of the present invention.

FIG. 3 is a functional block configuration diagram of the radio communication terminal 200. As shown in FIG. 2, the radio communication terminal 200 includes a radio communication unit 201, a radio signal processor 203, a symbol string configuration receiver 205, a symbol string configuration changing unit 207, and a baseband processor 209. Note that, in the following, a description of functional blocks that perform similar processing to the radio base station 100 described above will be omitted, as appropriate.

The radio communication unit 201 performs processing almost similar to the radio communication unit 101. Moreover, the radio signal processor 203 performs processing almost similar to the radio signal processor 105.

The symbol string configuration receiver 205 receives the symbol string configuration notification transmitted by the radio base station 100. The symbol string configuration receiver 205 notifies the symbol string configuration changing unit 207 of the symbol string configuration of the symbol string S included in the uplink radio signal $RS_{UP}$, on the basis of the received symbol string configuration notification.

The symbol string configuration changing unit 207 changes the symbol string configuration of the symbol string included in the uplink radio signal $RS_{UP}$ on the basis of the symbol string configuration notified by the symbol string configuration receiver 205. Specifically, the symbol string configuration changing unit 207 changes the symbol string configuration to any of the 4×2 configuration, the 2×2 configuration, the 2×4 configuration and a 8×1 configuration.

The baseband processor 209 performs processing almost similar to the baseband processor 113.

(Operation of Radio Communication System)

The operation of the radiocommunication system described above will be described hereinafter. Specifically, described is: (1) the operation of the radio base station 100 changing the symbol string configuration of the symbol string S on the basis of the receiving state of the uplink radio signal $RS_{UP}$; and (2) the operation of the radio communication terminal 200 setting the symbol string configuration of the symbol string S included in the uplink radio signal $RS_{UP}$, on the basis of the symbol string configuration notification transmitted by the radio base station 100.

(1) Radio Base Station 100

Figure 4:
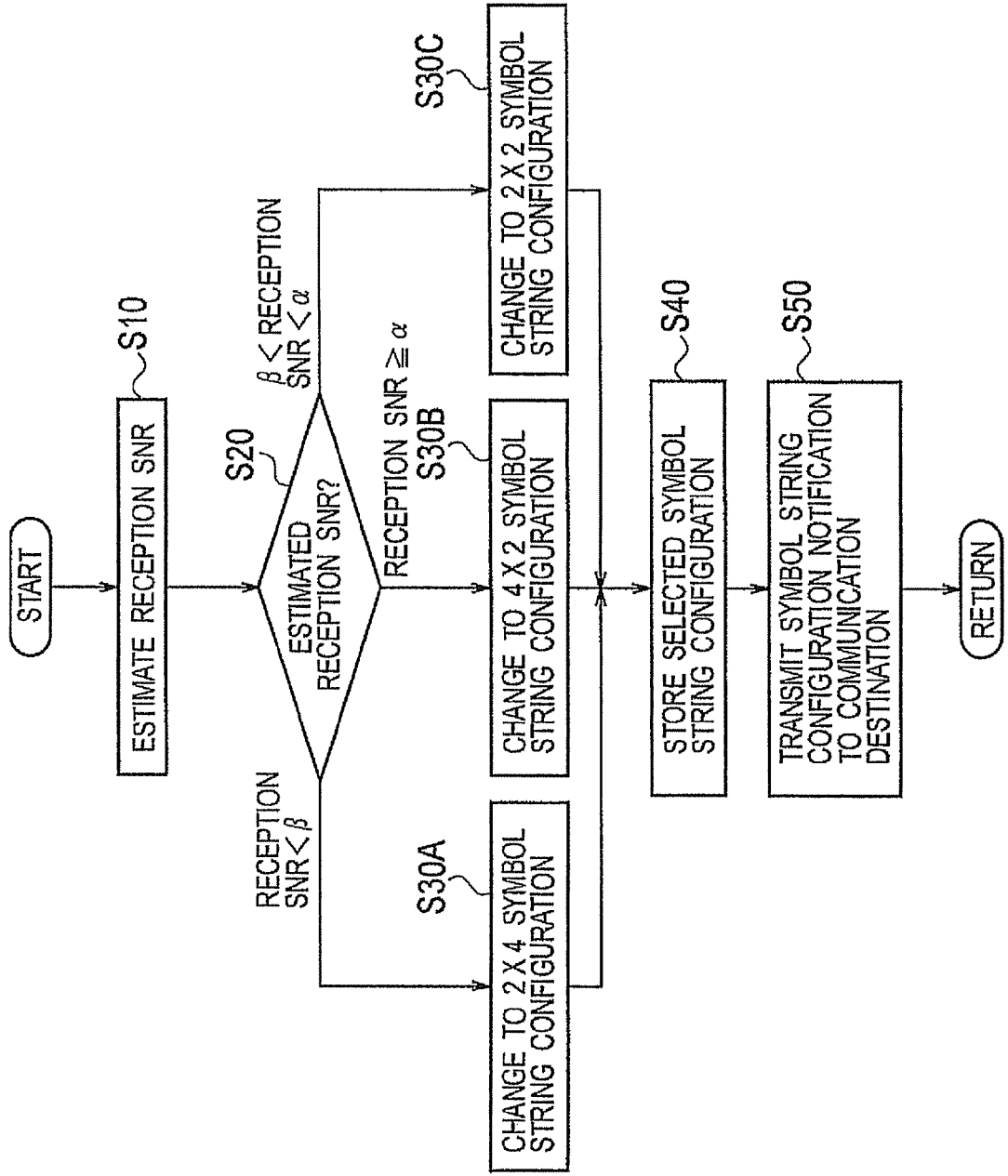
FIG. 4 is an operation flowchart of the radio communication device (radio base station) according to the embodiment of the present invention.

FIG. 4 is an operation flow diagram of the radio base station 100. As shown in FIG. 4, in step S10, the radio base station 100 estimates reception SNR of an uplink radio signal $RS_{UP}$ received from the radio communication terminal 200. Specifically, the radio base station 100 calculates correlation of a preamble symbol P and a data symbol D on the basis of the preamble symbol P included in the uplink radio $RS_{UP}$ signal, and estimates the reception SNR of the uplink radio signal $RS_{UP}$ (subcarrier).

In step S20, the radio base station 100 judges whether the estimated reception SNR satisfies a predetermined condition. Specifically, the radio base station 100 judges whether the estimated reception SNR is smaller than a threshold β, equal to or larger than a threshold α, or larger than the threshold β and smaller than the threshold α.

If the estimated reception SNR is smaller than the threshold β (in the case of "RECEPTION SNR<β" in step S20), in step S30A, the radio base station 100 changes the symbol string configuration of the symbol string S included in the uplink radio signal $RS_{UP}$ to the 2×4 configuration.

If the estimated reception SNR is equal to or larger than the threshold α (in the case of "RECEPTION SNR≥α" in step S20), in step S30B, the radio base station 100 changes the symbol string configuration of the symbol string S included in the uplink radio signal $RS_{UP}$ to the 4×2 configuration.

If the estimated reception SNR is larger than the threshold β and smaller than the threshold α (in the case of "β<RECEPTION SNR<α" in step S20), in step S30C, the radio base station 100 changes the symbol string configuration of the symbol string included in the uplink radio signal $RS_{UP}$ to the 2×2 configuration.

In step S40, the radio base station 100 stores the symbol string configuration that has been changed in one of the steps of steps S30A to S30C.

In step S50, the radio base station 100 transmits a symbol string configuration notification indicating the changed symbol string configuration to a communication destination, namely, the radio communication terminal 200.

As described above, in the embodiment, as a symbol string configuration, the 4×2 configuration (reference symbol string configuration), the 2×2 configuration (first narrowband symbol string configuration) which has a size smaller in the frequency axis direction $D_F$ than the 4×2 configuration, and the 2×4 configuration (second narrowband symbol string configuration) which has a size larger in the time axis direction $D_T$ than the 2×2 configuration are provided.

The radio base station 100, more specifically, the symbol string configuration changing unit 109 changes from the 4×2 configuration the symbol string configuration to the 2×2 configuration, when the receiving state judging unit 107 judges that the receiving state of the uplink radio signal $RS_{UP}$ does not satisfy the predetermined condition. In addition, when it is judged that the receiving state of the uplink radio signal $RS_{UP}$ does not satisfy the predetermined condition even in the 2×2 configuration, the symbol string configuration changing unit 109 can change the symbol string configuration from the 2×2 configuration to the 2×4 configuration.

In the operation flow shown in FIG. 4, the radio base station 100 changes the symbol string configuration to one of the 4×2 configuration, the 2×2 configuration, or the 2×4 configuration. However, the symbol string configuration may be also changed to the 8×1 configuration (see FIG. 9). In this case, as a condition for changing the symbol string configuration to the 8×1 configuration, the radio base station 100 uses reception SNR that is better than the threshold a used in judging whether or not to change the symbol string configuration to the 4×2 configuration.

(2) Radio Communication Terminal 200

Figure 5:
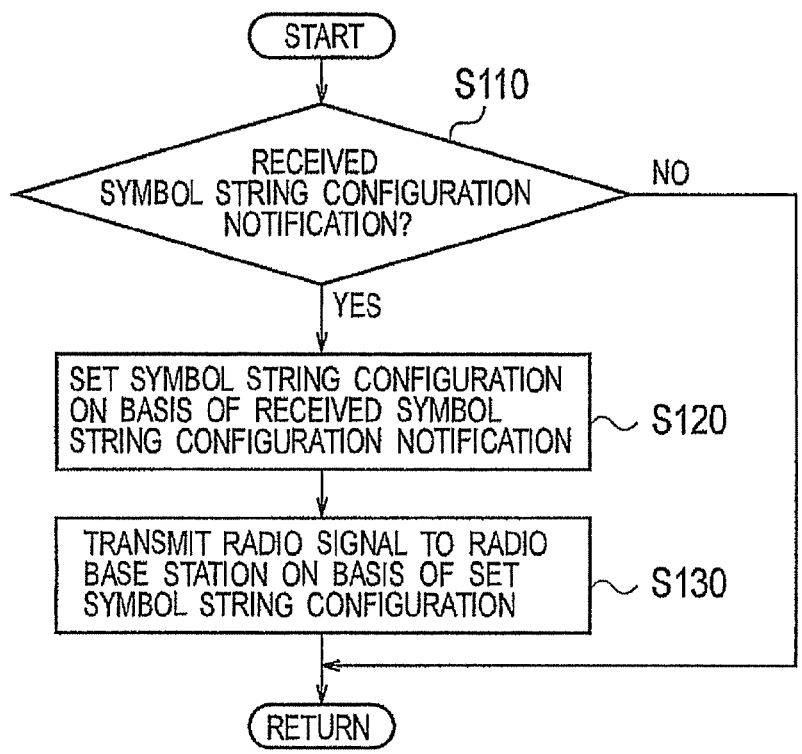
FIG. 5 is an operation flowchart of the radio communication device (radio communication terminal) according to the embodiment of the present invention.

FIG. 5 is an operation flowchart of the radio communication terminal 200. As shown in FIG. 5, in step S110, the radio communication terminal 200 judges whether or not a symbol string configuration notification has been received from the currently communicating radio base station 100.

If the symbol string configuration notification has been received (YES in step S110), in step S120, the radio communication terminal 200 sets the symbol string configuration of the symbol string S included in the uplink radio signal $RS_{UP}$, on the basis of the received symbol string configuration notification.

In step S130, the radio communication terminal 200 transmits, to the radio base station 100, the uplink radio signal $RS_{UP}$ including the symbol string S having the set symbol string configuration.

Effects and Advantages

As described above, in the embodiment, a basic size of the data symbol ID is 18 carriers in the frequency axis direction $D_F$ (2 bins) and 3 symbols in the time axis direction $D_T$.

Namely, the basic size of the data symbol D in the frequency axis direction $D_F$ and in the time axis direction $D_T$ is fixed.

In the embodiment, when reception SNR of an uplink radio signal $RS_{UP}$ is good (in the case of the reception SNR≥α, for example), the configuration of the symbol string S included in the uplink radio signal $RS_{UP}$ is changed to a symbol string configuration in which the size of the symbol string S is large in the frequency axis direction $D_F$ (4×2 configuration, for example). Accordingly, a greater number of preamble symbols P, which are necessary to obtain an antenna combined gain close to a theoretical value by adaptive array control, can be arranged in the frequency axis direction $D_F$. Thus, the number of the preamble symbols P to be arranged in the time axis direction $D_T$ is reduced, thereby improving transmission efficiency of the data symbol D. Furthermore, as the size in the time axis direction $D_T$ becomes smaller, effect of fading due to multipath is suppressed, and uniform communication quality can be ensured even if the radio communication terminal 200 moves at high speed.

Moreover, when the reception SNR of the uplink radio signal $RS_{UP}$ is poor (in the case of Reception SNR<β, for example), the configuration of the symbol string S included in the uplink radio signal $RS_{UP}$ is changed to a symbol string configuration in which the size of the symbol string S is large in the time axis direction $D_T$ (2×4 configuration, for example). Accordingly, the preamble symbol P, which is necessary to obtain the antenna combined gain close to the theoretical value by the adaptive array control, can be arranged while avoiding the effect of the frequency selective fading, although the transmission efficiency of the data symbol D degrades.

Other Embodiments

As described above, although the present invention is disclosed through one embodiment of the present invention, it should not be understood that dissertation and drawings that form a part of the disclosure limit the present invention. Various alternative embodiments will be apparent to one skilled in the art from this disclosure.

For example, the embodiment described above takes a form in which, as the symbol string configuration, size of a preamble symbol P in the frequency axis direction $D_F$ and in the time axis direction $D_T$ is changed depending on the receiving state of the uplink radio signal $RS_{UP}$. However, needless to say, it may also take a form in which the size of not the preamble symbol P part but the entire symbol string S in the frequency axis direction $D_F$ and in the time axis direction $D_T$ is changed.

In addition, the embodiment described above takes a form in which the reception SNR is used as the receiving state of the uplink radio signal $RS_{UP}$. However, as the receiving state of the uplink radio signal $RS_{UP}$, a received power value, timing jitter, or frequency offset amount of the uplink radio signal $RS_{UP}$ may also be used.

Furthermore, in the embodiment described above, the radio communication terminal 200 is a card type radio communication terminal. However, the radio communication terminal 200 may take any form other than the card type, for example, a mobile phone terminal.

In addition, the embodiment described above takes a form in which the radio communication terminal 200 sets a symbol string configuration of a symbol string S included in an uplink radio signal $RS_{UP}$ on the basis of a symbol string configuration notification received from the radio base station 100. However, it may take a form in which the radio communication terminal 200 estimates the condition of the uplink radio signal RS on the basis of the receiving state of the downlink radio signal $RS_{DOWN}$ and sets the symbol string configuration of the symbol string S included in the uplink radio signal $RS_{UP}$.

As described above, of course, the present invention includes various embodiments that have not been described herein. Therefore, a technical scope of the present invention is defined only by matters specific to the invention according to scope of claims appropriate from the above-described description.

Additionally, the entire content of Japanese Patent Application No. 2006-207240 (filed on Jul. 28, 2006) is incorporated herein by reference.

INDUSTRIAL APPLICABILITY

As described above, the radio communication device and the radio communication method according to the present invention can perform adaptive array control in which a desired antenna combined gain can be obtained irrespective of the receiving state of a radio signal, while suppressing degradation of transmission efficiency of data symbols. Accordingly, the radio communication device and the radio communication method according to the present invention are useful in radio communications such as mobile communication.

The invention claimed is:

1. A radio base station that receives from a radio communication terminal an uplink radio signal including a known signal, in a radio communication system that uses at least an orthogonal frequency division multiplexing, wherein
    the known signal is used for estimating quality of a radio resource in the uplink by the radio base station, arranged in a frequency axial direction, and arranged at a location fixed within a sub-frame in a time axial direction,
    the radio base station comprises notification means that notifies the radio communication terminal of signal configuration designation information including an element relating to a bandwidth of the known signal in the frequency axial direction, the element being indicating the number of frequency bands where a predetermined number of subcarriers are one unit, wherein
    the notification means notifies the radio communication terminal of the element relating to the bandwidth of the known signal, without notifying the radio communication terminal of a location of the known signal within the sub-frame in the time axial direction.

2. A radio communication terminal that transmits an uplink radio signal including a known signal to a radio base station, in a radio communication system that uses at least an orthogonal frequency division multiplexing, wherein
    the known signal is used for estimating quality of a radio resource in the uplink by the radio base station, arranged in a frequency axial direction, and arranged at a location fixed within a sub-frame in a time axial direction,
    the radio communication terminal comprises reception means that receives, from the radio base station, signal configuration designation information including an element relating to a bandwidth of the known signal in the frequency axial direction, the element being indicating the number of frequency bands where a predetermined number of subcarriers are one unit, wherein
    the reception means receives, from the radio base station, the element relating to the bandwidth of the known signal, without receiving from the radio base station, a location of the known signal within the sub-frame in the time axial direction.

3. A radio communication method in a base station that receives from a radio communication terminal an uplink radio signal including a known signal, in a radio communication system that uses at least an orthogonal frequency division multiplexing, wherein
the known signal is used for estimating quality of a radio resource in the uplink by the radio base station, arranged in a frequency axial direction, and arranged at a location fixed within a sub-frame in a time axial direction,
the radio communication method comprises a step of notifying the radio communication terminal of signal configuration designation information including an element relating to a bandwidth of the known signal in the frequency axial direction, the element being indicating the number of frequency bands where a predetermined number of subcarriers are one unit, wherein
in the notifying step, notifying the radio communication terminal of the element relating to the bandwidth of the known signal, without notifying the radio communication terminal of a location of the known signal within the sub-frame in the time axial direction.

4. A radio communication method in a radio communication terminal that transmits an uplink radio signal including a known signal to a radio base station, in a radio communication system that uses at least an orthogonal frequency division multiplexing, wherein
the known signal is used for estimating quality of a radio resource in the uplink by the radio base station, arranged in a frequency axial direction, and arranged at a location fixed within a sub-frame in a time axial direction,
the radio communication method comprises a step of receiving, from the radio base station, signal configuration designation information including an element relating to a bandwidth of the known signal in the frequency axial direction, the element being indicating the number of frequency bands where a predetermined number of subcarriers are one unit, wherein
in the receiving step, receiving, from the radio base station, the element relating to the bandwidth of the known signal, without receiving from the radio base station, a location of the known signal within the sub-frame in the time axial direction.

* * * * *